United States Patent Office 3,076,776
Patented Feb. 5, 1963

3,076,776
METHOD FOR IMPROVING THE EXTRUDA-
BILITY OF CRYSTALLINE POLYOLEFINS
WITH ALIPHATIC ALCOHOLS
Robert A. Findlay, Bartlesville, Okla., assignor to Phillips
Petroleum Company, a corporation of Delaware
No Drawing. Filed Oct. 30, 1958, Ser. No. 770,599
13 Claims. (Cl. 260—33.4)

This invention relates to a method of preparing olefin polymers of improved processability. Within the past few years new methods of polymerization of olefins have been disclosed by which high-density, highly crystalline polymers of ethylene and propylene of molecular weights greater than 100,000 have been produced. The present invention is directed to these polymers which have a density of at least 0.94, generally at least 0.96, at 20° C. and a crystallinity of at least 70 percent, generally at least 90 percent at 20° C. It is possible to prepare high-density, highly crystalline polymers in the presence of organo-metallic compounds such as triethylaluminum and titanium tetrachloride, mixtures of ethyl aluminum halides with titanium tetrachloride, and the like. Another group of catalysts which is used comprises a group IV metal, such as for example, titanium tetrachloride, silicon tetrabromide, zirconium tetrachloride, tin tetrabromide, etc., with one or more free metals such as sodium, potassium, lithium, rubidium, zinc, cadmium, or aluminum.

Another method for the production of the high-density, highly crystalline polymers is disclosed and claimed in Leatherman and Detter, Serial No. 590,567, filed June 11, 1956, which is an improvement on Hogan et al. 2,825,721. The improvement in the Leatherman et al. application comprises contacting the ethylene or a mixture of ethylene with other unsaturated hydrocarbons with the suspension of the chromium oxide-containing catalyst in a liquid hydrocarbon diluent, this contacting taking place at a temperature such that substantially all of the polymer produced is insoluble in the diluent and in solid particle form, the particles being substantially non-tacky and non-agglutinative and suspended in the liquid diluent.

The polymer formed by the Leatherman et al. process is of extremely high molecular weight, in the order of 60,000 to 120,000 and higher, the determination being based upon inherent viscosity. By this process, productivities in the order of 1,000 to 10,000 pounds of polymer per pound of catalyst have been realized. Generally, because of these high productivities, it is unnecessary to remove the catalyst from the polymer. However, the polymer has certain disadvantages in that it is relatively difficult to process by means of conventional equipment. Extrusion or injection molding of the polymer is relatively difficult due to the low melt index of the polymer, this being, at least in part, due to the high molecular weight. While not wishing to be bound by any theory for this difficulty, I believe that it may also be attributed to cross-linking during molding due to residual catalyst in the polymer.

In addition to the foregoing, high-density, highly crystalline polymers prepared by other methods can be used in the present invention.

The improvement of the present invention is based upon the discovery that the addition of a minor amount of an alcohol containing 10 to 25 carbon atoms per molecule to the high-density, highly crystalline polymer will improve the processability. In other words, this addition of the alcohol produces a product which will flow more easily within a mold and which exhibits less change in melt index following extrusion.

The following are objects of my invention.

An object of my invention is to provide olefin polymers of improved processability. A further object of my invention is to provide improved polyethylene, polypropylene, and polymers of ethylene or propylene with small amounts of other 1-olefins. A further object of my invention is to provide an improved process for the production of polyolefins including, particularly, polyethylene and copolymers of ethylene with other mono-olefins.

Other objects and advantages of my invention will become apparent to one skilled in the art upon reading the accompanying disclosure.

In the Leatherman et al. application, the liquid hydrocarbon diluent serves as an inert dispersant and heat transfer medium in the practice of the process. While the liquid hydrocarbon is a solvent for the ethylene feed, the polymer at the temperature at which the polymerization is carried out is insoluble in the liquid hydrocarbon. Liquid hydrocarbons which can be used are those which are liquid and chemically inert under the reaction conditions. Paraffins, such as those having from 3 to 12, preferably from 3 to 8, carbon atoms per molecule can be advantageously utilized. Examples of paraffins which can be used include propane, n-butane, n-pentane, isopentane, n-hexane, n-decane, 2,2,4-trimethylpentane (isooctane), and the like. It is to be understood that some naphthenes can be tolerated in the liquid paraffin, and that mixtures of paraffins and/or isoparaffins can be employed. Another class of hydrocarbons which can be used are naphthenic hydrocarbons having from 5 to 6 carbon atoms in a naphthenic ring and which can be maintained in the liquid phase under the polymerization conditions. Examples of such naphthenic hydrocarbons are cyclohexane, cyclopentane, methylcyclopentane, methylcyclohexane, ethylcyclohexane, the methyl ethyl cyclopentanes, the methyl propyl cyclohexanes, and the ethyl propyl cyclohexanes. A preferred subclass of naphthenic hydrocarbons within the above described general class is constituted by those naphthenic hydrocarbons having from 5 to 6 carbon atoms in a single ring and from 0 to 2 methyl groups as the only substituents on the ring. Thus, the preferred naphthenic hydrocarbons are cyclopentane, cyclohexane, methylcyclopentane, methylcyclohexane, the dimethylcyclopentanes, and the dimethylcyclohexanes. It is also possible to utilize mixtures of paraffinic and naphthenic hydrocarbons as the reaction medium.

When utilizing butane and higher paraffinic hydrocarbons as the reaction medium, the polymerization temperature is generally in the range of about 230° F. and below, preferably 225° F. and below. Propane having a critical temperature of about 206° F. is useful in the range in which it can be maintained in the liquid phase. The temperature range for naphthenic hydrocarbons is about 190° F. and below, preferably about 180° F. and below. If mixtures of paraffinic and naphthenic hydrocarbons are employed, the upper temperature limit will be between 190 and 230° F., depending upon the composition of the mixture.

With regard to the upper temperature limits set forth hereinabove, in the case of paraffinic diluents, the temperature is approximately 230° F. and for cycloparaffinic diluents approximately 190° F. There is a very narrow temperature range or area where the transformation, i.e., from tacky, agglomerated polymer to granular polymer, takes place, and conditions can be varied so as to change the absolute upper limit slightly. However, the absolute upper limits for paraffins and cycloparaffins are approximately the temperatures indicated, and at the preferred upper limits granular polymer is formed in all cases. The lower temperature limit for practicing the process of this invention is not critical, but the reaction rate is undesirably low below 150° F. and impractical below 100° F.

My invention resides in the step of adding a long chain alcohol to the polymer, thus improving the processability of the polymer. This improvement is believed to be the result of at least partial inactivation of the catalyst remaining in the polymer and in providing a lubricating effect in the polymer.

The type of compound which performs both of these functions by the practice of my invention is a long-chain alcohol containing from 10 to 25 carbon atoms per molecule and preferably from 10 to 20 carbon atoms per molecule. These would include 1-decanol, 4-decanol, 1-undecanol, 2-undecanol, 1-dodecanol, 6-dodecanol, 1-tridecanol, 1-pentadecanol, 1-octadecanol, 1-eicosanol, 1-docosanol, 1 - tetracosanol, 1,14 - tetradecanediol, 1,8 - heptadecanediol, 1,19-nonadecanediol, 1,21-heneicosanediol, and 1,25-pentacosanediol. Also suitable are long chain alcohols such as those obtained by the Bouveault-Blanc reduction of fish oils. e.g., sardine oil, which produces unsaturated alcohols of from thirteen to twenty-two carbon atoms per molecule. However, it is preferred to use long chain saturated monohydric alcohols.

The long chain alcohol, such as 1-decanol, can be added to the polymer at any time. Some of these addition points may be: directly after the reactor, after the diluent removal, or at a point prior to the extrusion of the polymer. However, the preferred point of addition, when using the Leatherman et al. method, is directly after the polymer slurry is withdrawn from the reactor. By adding the alcohol at this point, the alcohol will "kill" the catalyst activity and will, therefore, prevent any further cross-linking of the polymer. The alcohol remains in the polymer during the diluent removal step which can be accomplished by any suitable method such as a pressure reduction, temperature increase, etc.

When operating according to my invention, improved processing of the polymer will result. Extrusion rates will increase, injection molding rates will increase, and a "full-shot" will be realized in each molding cycle, thereby reducing the number of rejected molded specimens due to a "short-shot," an incomplete filling of the mold.

It is within the scope of my invention to use from 1 to 10 percent of the long chain, monohydric alcohol in the polymer based on the polymer produced.

The following example illustrates my invention but should not be considered unduly limiting.

*Example*

In one run, a 90/10 silica-alumina catalyst containing hexavalent chromium, with a chromium content of 2.5 weight percent as chromium oxide was used. This catalyst was activated in air by heating to 1250° F. and held at this temperature for three hours after the dew point of the off-gas reached 0° F. The polymer was prepared in a 20-gallon continuous reactor operated with a 5-hour residence time using a temperature of 195° F. and a pressure of 350 p.s.i. Pentane, the liquid hydrocarbon diluent, was supplied to the reactor at a rate of three gallons per hour, ethylene was fed at a rate of 54.5 standard cubic feet per hour and butene-1 at a rate of 10 standard cubic feet per hour. The catalyst concentration in the reactor was 0.015 weight percent based upon total reactor contents. Polymer concentration in the reactor was approximately 16.5 weight percent on the same basis.

The product rate varied between 2.5 and 2.8 pounds per hour.

A portion of the polymer was recovered from the diluent and the properties determined. These are set forth in the following table:

| | | |
|---|---|---|
| Inherent viscosity | | 3.4 |
| Density [1] | g./ml | 0.940 |
| Environmental stress cracking [2] | hr | >1000 |
| Crystallinity | percent | 78 |
| Izod impact [3] | ft.lb/in | 6.6 |
| Stiffness [4] | | 71,000 |
| Tensile strength: [5] | | |
| Yield point | p.s.i | 2818 |
| Break point | p.s.i | 3604 |
| Elongation [5] | percent | 609 |
| Zero strength temperature | ° F | 242 |

[1] Run on Westphal balance at 20° C.
[2] Test specimens for the environmental stress cracking tests were die cut from compression molded slabs 0.125±0.005 inch thick. The dimensions of these specimens were 1.5±0.1 inches by 0.50±0.02 inch. Each sample was given a controlled imperfection 0.750±0.005 inch long and 0.020-0.025 inch deep parallel to the long edges of the sample and centered on one of the broad faces. Each of the 10 test specimens were bent into a loop with the controlled imperfection on the outside and inserted in a holder one above the other in a manner such that the samples did not touch one another. The holder was then inserted in a tube which was filled to approximately 0.5 inch above the top specimen with an alkyl aryl polyethylene glycol (Igepal CO-630, General Dyestuff Corp., New York, New York), a surface active agent, which had been adjusted to a temperature of 23±1.1° C. The tube was then stoppered and placed in a constant temperature bath at 50±0.5° C. The controlled imperfections were not allowed to touch the tube during the test. The test specimens were examined at intervals, and any crack visible to the unaided eye was interpreted as a failure, exclusive of extension of the controlled imperfection. The number of failures was plotted versus the logarithm of time and the best line was drawn through these points. The stress-crack time, $F_{50}$, is the time in hours taken from the curve at five failures. This test is similar to that described in Industrial and Engineering Chemistry, 43, 117–121 (1951).
[3] The impact strength was determined by ASTM Method D–256–47T.
[4] Determined by method of ASTM D–747–58. A Tinius-Olsen Stiffness Tester having ranges of 0.10 to 6.0 inch pounds was used. Test specimens, died out of compression moulded slabs, measured 0.500 inch wide, 4.50 inches long and 0.07 inch thick. The tests were performed at 73±2° F. The bending span in all cases was 2.0 inches.
[5] Determined by method of ASTM D–638–52T.

Varying amounts of 1-dodecanol were added to other portions of the polymer by spraying a solution of this alcohol in methanol onto the polymer, followed by evaporation of the methanol in an oven at 195° F. Amounts of 2 and 5 weight percent based upon the polymer was used and a further portion of the polymer was retained as a control.

The processability of the control and the copolymer containing the alcohol was determined by using a test wherein the material is forced into a spiral mold, the test being run at 450° F. The amount of material forced into the spiral mold is a measure of the processability, easier processability being obtained when a greater amount can be forced into the mold prior to freezing of the polymer. Results of these tests are set forth in the following table:

| Run | Dodecanol Content of Polymer, percent | Weight of 10 Spirals, g. | Increase in Flow, percent |
|---|---|---|---|
| 1 | 0 | 15.0 | |
| 2 | 2 | 17.0 | 13 |
| 3 | 5 | 18.8 | 25 |

Examination of this table shows that a very sizeable increase in flow is obtained when the alcohol is mixed with the polymer. This increase is due, at least in part, to a lubricating effect in the polymer.

Runs were also made to determine the melt index before and after molding on each of these materials. In this test, the ASTM melt index test was used, ASTM D–1238–52T, with a two minute interval between cuts. The results of these tests are shown in the following table, the numerals 1-5 indicating five successive cuts of the material as it issued from the orifice. These melt index tests were made at high load conditions (2160 grams).

| | Control | | 2% Dodecanol | | 5% Dodecanol | |
|---|---|---|---|---|---|---|
| | Before Molding | After Molding | Before Molding | After Molding | Before Molding | After Molding |
| | | | Melt Index Drop-Off | | | |
| 1 | 1.01 | 0.39 | 1.11 | 0.54 | 1.17 | 0.78 |
| 2 | 1.01 | 0.39 | 1.11 | 0.57 | 1.17 | 0.84 |
| 3 | 1.02 | 0.38 | 1.14 | 0.59 | 1.20 | 0.86 |
| 4 | 1.02 | 0.39 | 1.19 | 0.61 | 1.24 | 0.89 |
| 5 | 1.04 | 0.40 | 1.25 | 0.64 | 1.25 | 0.96 |

It will be noted that each material exhibits a slight increase in melt index, but on the whole remained nearly constant. However, a comparison of the results before and after molding emphasizes the improvement obtained by the present invention. The decrease in melt index was considerably lessened by the presence of dodecanol. As previously stated, this may well be due to a reduction in cross-linking of the polymer when exposed to the high temperature and pressure of the molding operation.

In the spiral mold test above referred to, the mold consists of spiral cavity 3/8 inch wide, 1/16 inch deep, and 48 inches in length. Using a pressure of 20,000 p.s.i., a number of specimens are molded and discarded. Thereafter ten specimens were molded and weighed.

Polymer crystallinity was determined according to the following procedure: Two grams of polymer are placed in a one inch mold having aluminum foil discs covering each mold face. The sample is pressed cold to about 2000 p.s.i. and heated to 170-180° C., following which the pressure is increased to 5000 p.s.i. and maintained at this level for about 5 minutes at the same temperature. The sample is then cooled to 50-60° C. at a rate of about 4° C. per minute (in the temperature range of 150-120° C.). Following this the sample is cooled with air blast to room temperature after which it is removed from the mold and trimmed, if necessary, to provide one flat face. The sample is then placed in a rotating specimen holder of a North American Phillips diffractometer and examined with a copper target X-ray tube operated at 40 kv. peak and 18 ma. using 1/2 degree divergent slits, 0.006 inch collecting slit, and nickel foil filter. The scintillation counter, X-ray detector, linear amplifier and pulse height analyzer are used with proper settings so that the system passes 90 percent of the counts due to K alpha radiation that would be passed in the absence of the analyzer. A time constant of 8 seconds is used and scale factors are selected so that the most intense peak of the pattern remains on the chart. The sample is scanned from 12 degrees two theta to 28 degrees two theta using a scanning speed of 1/2 degree two theta per minute and a charge speed of 1/2 inch per minute. At the beginning of each run the signal level existing with the X-ray beam shutter closed is recorded. To utilize the X-ray record a straight background line is drawn from the point on the curve at 15.4 degrees two theta to the point on the curve at 25.5 degrees two theta. From the point on the curve at 19.7 degrees two theta a straight line is drawn to the point on the curve at 17.7 degrees two theta and from there to the point at 15.4 degrees two theta. The height above the point at 15.4 degrees two theta. The height above the background of the point at 17.7 degrees two theta is measured and a point is marked at this same height above the background at 21.7 degrees two theta, then straight lines are drawn from this point to the peak of the amorphous band at 19.7 degrees two theta and to the point of the background line at 24.0 degrees two theta. These lines give the contribution of the amorphous band to the intensity in the region of the crystalline peaks. The area of the amorphous band in square centimeters is obtained from the formula $5.1a+10.9b$ where $a$ and $b$ are the heights of the curve above background at 19.7 degrees and 17.7 degrees two theta, respectively, measured in centimeters. The 110 crystalline peak is resolved by drawing in the high angle sides so that it meets the amorphous line at about 23.0 degrees two theta. The area of the 110 and 200 crystalline peaks in square centimeters is measured using a metric planimeter. The percent crystallinity is then computed from the formula:

$$\frac{I_{110}+1.45I_{200}}{I_{110}+1.45I_{200}+0.73I_A} \times 100$$

where $I_{110}$, $I_{200}$, and $I$ are the areas of the 110 peak, 200 peak and amorphous band, respectively.

For density determination a sample is prepared by compression molding of the polymer at a temperature of 320° F. and a pressure of 10,000-15,000 lbs./square inch in a Pasadena Hydraulic Press. The sampe is maintained at about 320° F. until it is completely molten. It is then cooled from 320 to 250° F. at the rate of approximately 14° F. per minute. The sample was permitted to cool to below 150° F. before being removed from the press. The resulting sample is approximately 3x3x1/16 inches. A small piece of this sample is cut and inspected to insure that it is free of voids. The small sample is placed in a sample receiver of a Westphal balance. Carbon tetrachloride and methylcyclohexane are then introduced into the receiver in such proportions that the sample is suspended in the mixed solution, i.e., it neither floats nor sinks. After the liquids have been so proportioned that the polyethylene is suspended therein without sinking or floating at a temperature of 20° C., the density of the liquid mixture is equal to the density of the solid polymer. The polymer sample is then removed from the liquid and the specific gravity of liquid is measured on the Westphal balance at a temperature of 20° C. This specific gravity is equal to specific gravity of the polyolefin. For most practical purposes, the specific gravity can be considered identical to the density. However, if a precise conversion to actual density units (grams per cc.) is desired, this is readily referrable to water at 4° F. by calculations which are readily evident to those skilled in the art. The precision of a single specific gravity determination is ordinarily within ±0.0002.

As many possible embodiments can be made of this invention without departing from the scope thereof, it is to be understood that all matter herein set forth is to be interpreted as illustrative and not as unduly limiting the information.

I claim:
1. A method for improving the extrudability of a highly crystalline polymer of a 1-olefin, said polymer having a density of at least 0.94 at 20° C., comprising adding to the polymer a minor amount of an aliphatic alcohol containing oxygen only in hydroxyl groups and containing 10 to 25 carbon atoms per molecule.
2. The process of claim 1 wherein the amount of said alcohol is 1 to 10 percent by weight based on the weight of said polymer.
3. The process of claim 1 wherein said alcohol is a saturated monohydric alcohol.
4. The process of claim 1 wherein said alcohol is added directly to the effluent from a polymerization zone.
5. The process of claim 1 wherein said alcohol is added to the polymer after separation of the polymer from a liquid hydrocarbon reaction medium.
6. The process of claim 1 wherein said alcohol is 1-dodecanol.
7. The process of claim 1 wherein said alcohol is 1-decanol.
8. The product produced by the process of claim 1.
9. The product produced by the process of claim 6.
10. In the polymerization process comprising contacting a member selected from the group consisting of ethylene and mixtures of ethylene with other 1-olefins with a suspension of a chromium oxide-containing catalyst in a liquid hydrocarbon at a temperature such that substantially all of the polymer produced is insoluble in said liquid hydrocarbon and is difficultly extrudable, the improvement comprising adding to the polymer a minor amount of an aliphatic alcohol containing oxygen only in hydroxyl groups and containing 10 to 25 carbon atoms per molecule, said aliphatic alcohol deactivating residual catalyst in the polymer and improving the extrudability thereof.

11. The method for improving the extrudability of an olefin polymer having a density in the range of 0.94 to 0.96 at 20° C. and a crystallinity of 70 to 90 percent at 20° C., comprising adding to the polymer a minor amount of an aliphatic alcohol containing 10 to 25 carbon atoms per molecule.

12. The process of claim 1 wherein the alcohol is 1-dodecanol and said alcohol is added in an amount of 1 to 10 percent by weight based on the weight of said olefin polymer.

13. A method for improving the extrudability of a copolymer of ethylene and butene-1 having a density of 0.94 at 20° C., comprising adding 2 to 5 weight percent of 1-dodecanol to said polymer.

References Cited in the file of this patent

UNITED STATES PATENTS

| | | |
|---|---|---|
| 2,525,691 | Lee et al. | Oct. 10, 1950 |
| 2,825,721 | Hogan et al. | Mar. 4, 1958 |
| 2,898,233 | Hmiel | Aug. 4, 1959 |
| 2,980,964 | Dilke | Apr. 25, 1961 |